United States Patent [19]

Yokoyama et al.

[11] Patent Number: 5,450,623
[45] Date of Patent: Sep. 12, 1995

[54] CN RATIO MEASURING APPARATUS

[75] Inventors: Itoshi Yokoyama; Masaaki Nagai; Kenichi Ishida; Kakuya Saito, all of Kanagawa, Japan

[73] Assignee: Leader Electronics Corp., Kanagawa, Japan

[21] Appl. No.: 122,281

[22] Filed: Sep. 17, 1993

[30] Foreign Application Priority Data

Sep. 18, 1992 [JP] Japan .................................. 4-250017

[51] Int. Cl.6 ........................................... H04B 17/00
[52] U.S. Cl. ............................. 455/226.1; 455/226.3; 455/67.3; 324/614
[58] Field of Search ..................... 455/67.7, 67.3, 115, 455/226.2, 226.3, 226.4, 226.1; 324/614

[56] References Cited

U.S. PATENT DOCUMENTS 4,125,809 11/1978 Mott ..................................... 325/363
5,313,651 5/1994 Kurita ............................... 455/226.3

FOREIGN PATENT DOCUMENTS

WO86/07157 12/1986 European Pat. Off. .
61-274495 12/1986 Japan .

OTHER PUBLICATIONS

Test & Measurement Catalog published by Hewlett-Packard Company, 1991, pp. 245, 250–252, 264, 268–269.
"New CATV Techniques" edited by Electric Telecommunication Technology Committee, issued Nov. 20, 1987 pp. 246–257 (No translation).
"All of Spectrum Analyzer" issued May 20, 1977 by Yokogawa-Hewlett-Packard Ltd., pp. 229–231 (No translation).
"Techniques for Broadcasting Satellite" issued Nov. 20, 1982 by Nippon Hohso Publishing Kyokai, pp. 40–45 (No translation).
"A computer-controlled satellite communications monitoring system for time division multiple access", Comsat Technical Review, Fall 1984, vol. 14, No. 2 (pp. 391–430).
European Search Report, Dec. 23, 1993.

*Primary Examiner*—Edward F. Urban
*Assistant Examiner*—Doris To
*Attorney, Agent, or Firm*—Fish & Richardson

[57] ABSTRACT

A measuring apparatus is provided which is capable of measuring CN ratio. The measuring apparatus has a measuring band specifying unit for specifying a band under measurement; a display for displaying the spectrum of levels measured in the specified band; first and second noise measuring frequency specifying units; a transmission channel selector; and a CN ratio calculating unit for estimating a noise level at a carrier of a selected transmission channel and for calculating the CN ratio using the estimated level.

8 Claims, 9 Drawing Sheets

| (SAT) PRG EDIT | | | | DC VOLT. |
|---|---|---|---|---|
| SAT | < C/N  OFF > | | DC | |
| JAPAN BS<br>N1 :         N2 : | | | 15V | INS |
| No. | SAT | CH | FREQ. | |
| 1 | 2 | 5 | 1126 | DEL |
| 2 | 2 | 7 | 1165 | |
| 3 | 2 | 9 | 1203 | |
| 4 | 2 | 11 | 1241 | END |
| | | | | WRITE |

| (SAT) PRG EDIT | | | | DC VOLT. |
|---|---|---|---|---|
| SAT | < C/N  ⟨OFF⟩ > | | DC | |
| JAPAN BS<br>N1 :         N2 : | | | 15V | INS |
| No. | SAT | CH | FREQ. | |
| 1 | 2 | 5 | 1126 | DEL |
| 2 | 2 | 7 | 1165 | |
| 3 | 2 | 9 | 1203 | |
| 4 | 2 | 11 | 1241 | END |
| | | | | WRITE |

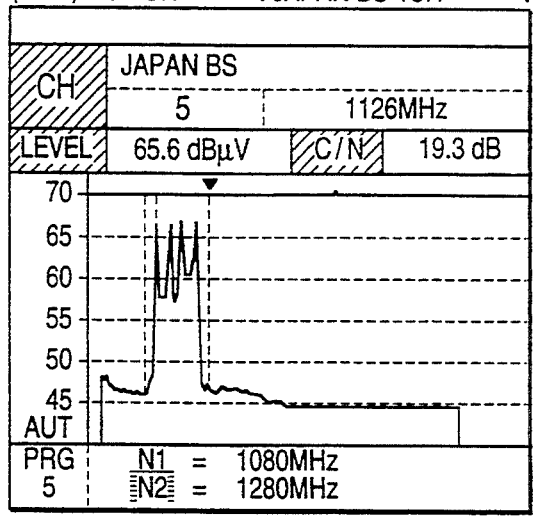

FIG. 9(a)
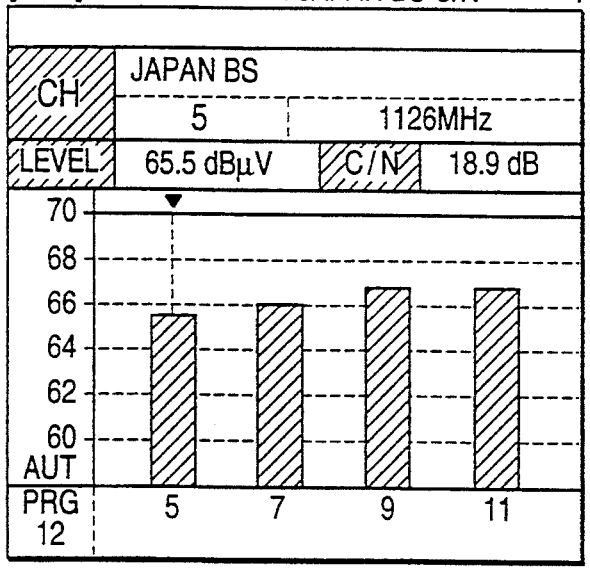
FIG. 9(b)
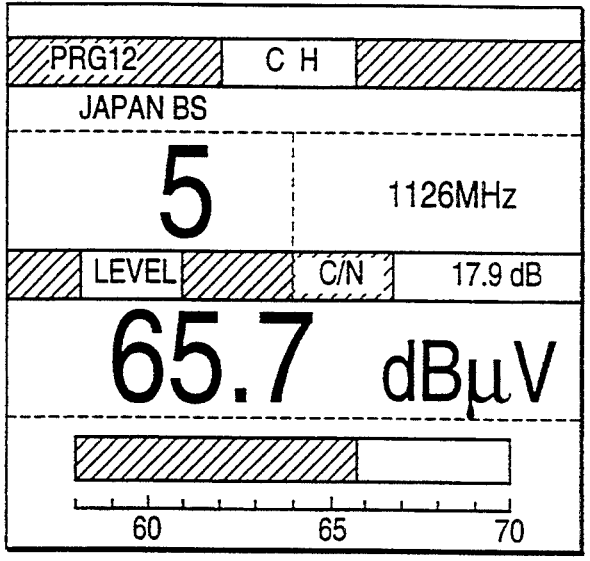
FIG. 9(c)
| [SAT] | 15V ON | JAPAN BS | C/N |
|---|---|---|---|
| CH | FREQ [MHz] | LEVEL [dBµV] | C/N [dB] |
| (JAPAN BS | ) | | |
| 5 | 1126 | 65.6 | 18.2 |
| 7 | 1165 | 66.3 | 18.9 |
| 9 | 1203 | 66.9 | 19.5 |
| 11 | 1241 | 66.3 | 18.9 |

CN RATIO MEASURING APPARATUS

BACKGROUND OF THE INVENTION

1. Field of the Invention

The present invention relates to a CN (Carrier to Noise) ratio measuring apparatus for measuring the CN ratio of signals sent along transmission paths such as a transmission path of a broadcast satellite or a communication satellite.

2. Description of the Prior Art

Conventionally, there are known three types of methods of measuring CN ratio (ratio of a carrier power to a noise power) for satellite broadcast signals. A first type is known as "an in-carrier noise equalizing method" which is disclosed in Japanese Patent Public-Disclosure No. 61-274495. The method is employed for detecting a noise power in a vertical blanking period of a TV video signal and calculates the ratio of the noise power to a separately measured carrier power to derive a CN ratio. A second type is known as "an SN ratio converting method" which demodulates a received signal and measures the SN ratio for the demodulated signal which is then converted to a CN ratio. A third type is a method using a spectrum analyzer. "New CATV Techniques" edited by Electric Telecommunication Technology Committee describes on pages 246-257 "CN Ratio Measuring Method for Signals Received through Satellite Broadcasting" using a spectrum analyzer. This method measures the electric power of noise immediately outside of the band of a carrier to be measured to derive a noise power of the carrier and calculate the ratio of the thus measured noise power to a separately measured power of the carrier.

Since the in-carrier noise equalizing method extracts noise in the vertical blanking period, it requires the use of a complicated demodulator. The second SN ratio converting method also requires a demodulator which must be stable over a wide band. Further, the third method using a spectrum analyzer not only requires an expensive spectrum analyzer but also is required to perform complicated calculations for deriving a CN ratio.

SUMMARY OF THE INVENTION

In view of the problems stated above, it is an object of the present invention to provide a CN ratio measuring apparatus which allows an operator to easily measure a CN ratio.

It is another object of the present invention to provide a low cost CN ratio measuring apparatus which is capable of measuring a CN ratio.

To achieve the above objects, the present invention utilizes the fact that a noise level of a carrier on at least one transmission channel is substantially linear in a frequency band including the frequency of the carrier on a logarithmic frequency scale.

Specifically, a CN ratio measuring apparatus according to the present invention is adapted to measure the CN ratio of a signal transmitted through at least one transmission channel included in a transmission path, and comprises level measuring means having an input for receiving an output of the transmission path, a frequency specifying input for receiving signals which specify frequencies, an output for generating levels measured at frequencies specified by the signals received by the frequency specifying input; means for generating to the frequency specifying input a signal which specifies a frequency band in which the output of the transmission path is to be measured; display means coupled to the output of the level measuring means for displaying the spectrum of the measured levels in the frequency band under measurement; transmission channel selecting means coupled to the frequency specifying input for specifying a first frequency which is a carrier frequency of a selected one in the at least one transmission channel; noise measuring frequency specifying means coupled to the frequency specifying input for specifying a second frequency which is lower than the carrier frequency of the selected transmission channel and at which no signal components are present, and a third frequency which is higher than the carrier frequency of the selected transmission channel and at which no signal components are present; and CN ratio calculating means coupled to an output of the transmission channel selecting means, an output of the noise measuring frequency specifying means and the output of the level measuring means for deriving a CN ratio of the selected transmission channel from the first, second and third frequencies and first, second and third measured levels at the respective frequencies generated from the level measuring means.

Also, according to the present invention, the CN ratio calculating means includes means for deriving a fourth level, which is a noise level at the first frequency, from the second and third measured levels, as well as the first, second and third frequencies; and means for deriving the CN ratio from the first measured level and the fourth level.

Further, according to the present invention, the second and third frequencies are specified to values which are regarded to exhibit a noise level linearity between the second and third frequencies with respect to frequency, in accordance with the spectrum of measured levels displayed on the display means.

Further, according to the present invention, the at least one transmission channel includes a plurality of channels, the second frequency is specified to be a value lower than the lowest frequency channel of the plurality of channels, and the third frequency is specified to be a value higher than the highest frequency channel of the plurality of channels.

BRIEF DESCRIPTION OF THE DRAWINGS

The present invention will hereinafter be explained in connection with the preferred embodiment with reference to the accompanying drawings:

FIGS. 8(a)-8(c) are diagrams illustrating displays presented on the screen of FIG. 4 during executing the CN ratio measuring flow;

FIGS. 9(a) and 9(b) are diagrams illustrating displays for displaying a measured CN ratio on the screen; and FIG. 9(c) illustrates a printed data list for all specified channels.

Figure 1:
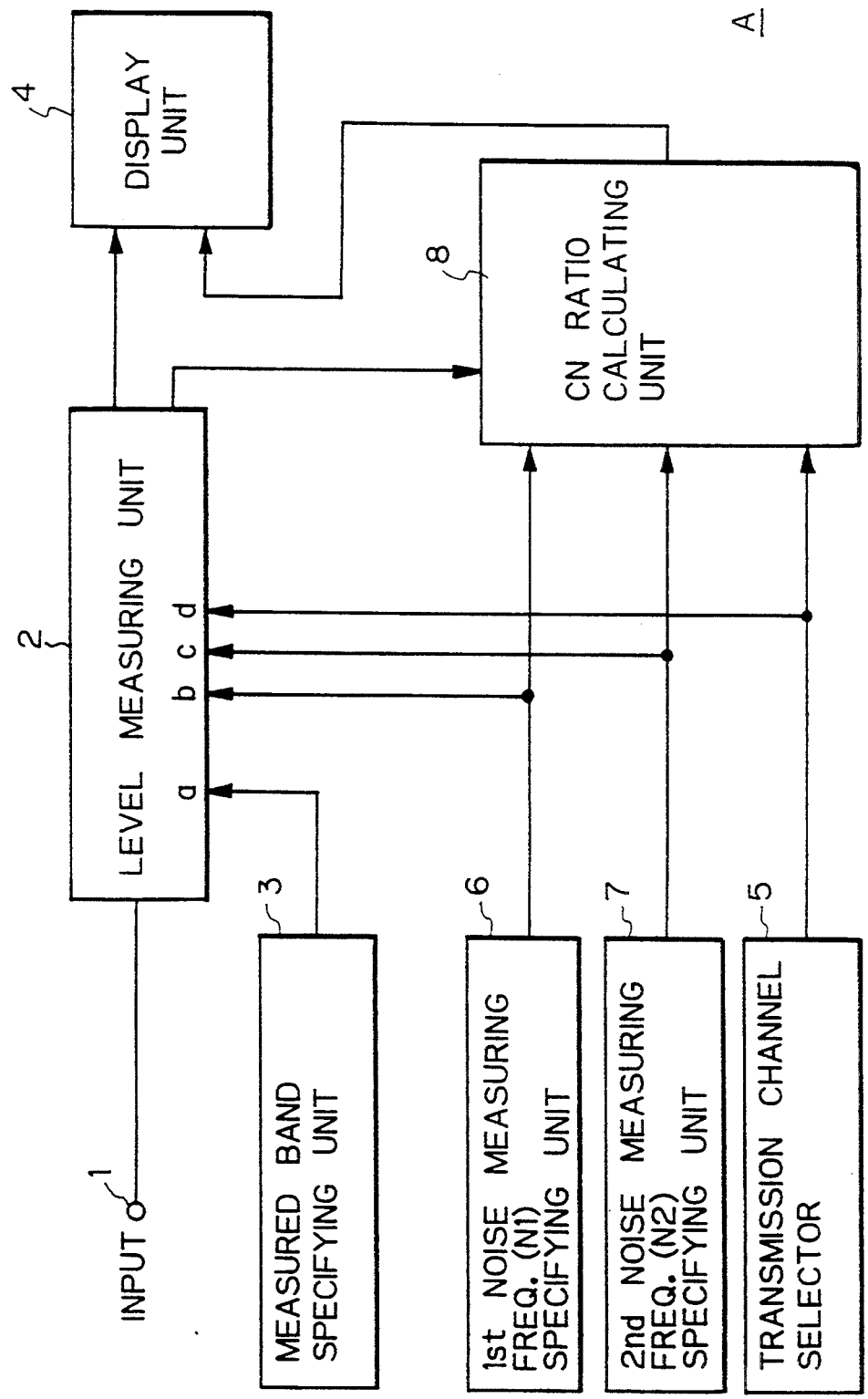
FIG. 1 is a diagram illustrating a basic configuration of a CN ratio measuring apparatus according to the present invention.

DETAILED DESCRIPTION OF THE PREFERRED EMBODIMENT:

FIG. 1 illustrates a basic configuration of a CN ratio measuring apparatus A according to the present invention. The measuring apparatus A is capable of measuring the CN ratio of a signal on a transmission path having at least one transmission channel. As can be seen from the drawing, the apparatus A has an input terminal 1 for receiving an output from the transmission path. The input terminal 1 is coupled to a level measuring unit 2 which has a plurality of frequency specifying inputs a, b, c and d each for receiving a signal for specifying a frequency or frequencies at which level measurement is performed; and an output for providing measured levels at frequencies specified by the signals received at the frequency specifying inputs. A measured band specifying unit 3 is provided for generating a signal for specifying a frequency band in which an output of the transmission path is to be measured. The frequency band specifying signal is provided to the frequency specifying input a. The output of the level measuring unit 2 is coupled to a display unit 4 which displays the spectrum of levels measured in the measured frequency band. A transmission channel selector 5 is coupled to the frequency specifying input d for specifying the carrier frequency of a transmission channel selected within at least one transmission channels. First and second noise measuring frequency specifying units 6 and 7 are respectively coupled to the frequency specifying input terminals b and c for specifying a first noise measuring frequency N1 which is lower than the carrier frequency of the selected transmission channel and at which no signal components are present, and a second noise measuring frequency N2 which is higher than the selected transmission channel carrier frequency and at which no signal components are present. Further, the CN ratio measuring apparatus A comprises a CN ratio calculating unit 8 which is coupled to the outputs of the selector 5, specifying units 6 and 7, and level measuring unit 2. The output of the calculating unit 8 is coupled to the display unit 4.

The measuring apparatus A operates in two modes. In a first operation mode, the level measuring unit 2 sequentially measures levels in every predetermined frequency band over a frequency region under measurement and displays the spectrum on the display unit 4. In a second operation mode, when the frequencies N1 and N2 and the carrier frequency are specified, the level measuring unit 2 sequentially measures levels at each of the frequencies and outputs measured level values to the calculating unit 8. The calculating unit 8 calculates the CN ratio of the selected transmission channel from the frequencies and the respective measured level values corresponding thereto, and feeds the calculation result to the display unit 4 for display.

Figure 2:
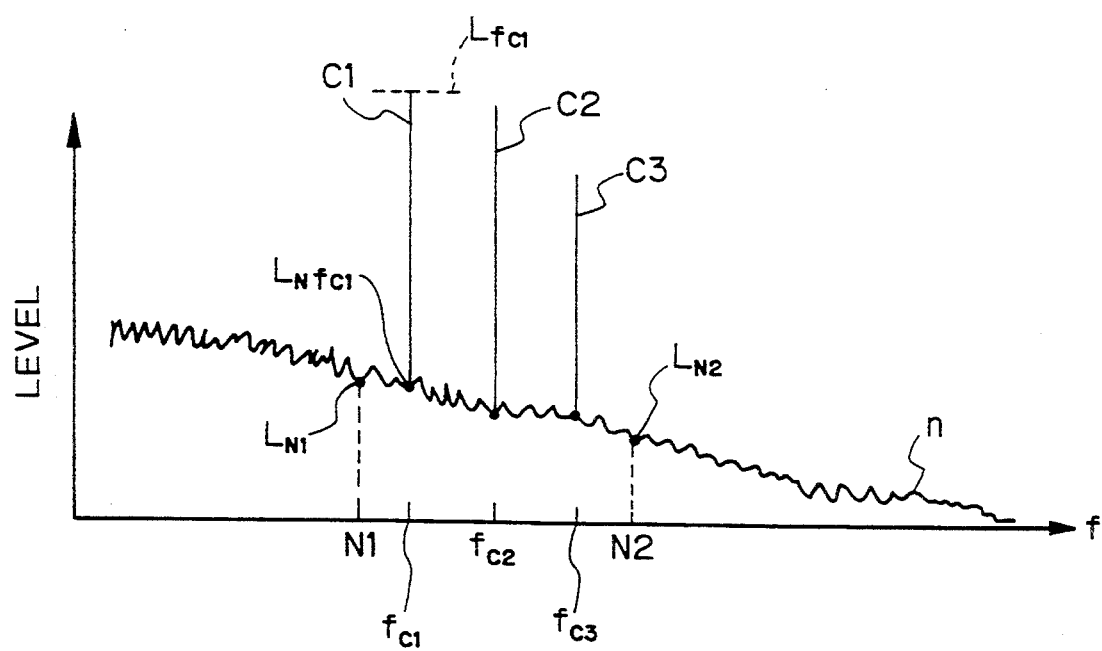
FIG. 2 is a frequency spectrum diagram used for explaining a method of estimating a noise level of a carrier in a transmission channel.

Now, the principle of the CN ratio calculation performed by the calculating unit 8 will be explained with reference to FIG. 2. The calculating method is similar to the CN ratio measurement by the conventional method using a spectrum analyzer. FIG. 2 illustrates a frequency spectrum of a frequency band including three transmission channels which includes noise components n, the level of which decreases as the frequency is higher, and three carrier components c1, c2 and c3. Note that the vertical axis in FIG. 2 represents levels in dB$\mu$V. As illustrated, when the level of the noise components n varies in a substantially linear relationship with the frequency, a noise level $L_{Nfc1}$ of the carrier c1 can be estimated from noise levels $L_{N1}$ and $L_{N2}$ at the frequencies N1 and N2 which are outside of the carrier band and the ratio of ($f_{c1}$−N1) to (N2−N1). The accuracy of the estimation becomes higher as the degree of linearity of the noise components n increases and N1 and N2 are set closer to the carrier frequency $f_{c1}$.

For example, in a BS channel, signals from a broadcasting satellite are received by a parabolic antenna, amplified by a converter attached to the antenna, and coupled to a BS tuner through a cable. Generally, the converter is designed such that the frequency characteristics thereof is substantially flat. The cable causes signals to be attenuated due to cable loss in logarithmically linear fashion. Therefore, in most cases, the level of noise appearing at the output of the convertor or at the input of the BS tuner presents substantially flat or logarithmically linear attenuation. Thus, the noise level of a carrier can be approximately calculated by the aforementioned method.

Once an estimated value of the noise level $L_{Nfc1}$ of the carrier c1 is derived, the CN ratio can be calculated by measuring the level $L_{fc1}$ of the carrier c1. While explanation has been given of the calculation of the CN ratio for the carrier c1, the CN ratio can be calculated in a similar manner for the other carriers c2 and c3. When the carrier c1 is the only one in the spectrum shown in FIG. 2, a value more approximate to the noise level $L_{Nfc1}$ can be derived if N2 is brought closer to $f_{c1}$.

Next, a TV/SAT (satellite) signal level meter AA which embodies the basic configuration of the present invention will be explained with reference to FIGS. 3 and 4. It should be noted that since TV signal level measurement is not related to the present invention, explanation thereof will be omitted, and parts associated with the SAT signal will only be explained.

Figure 3:
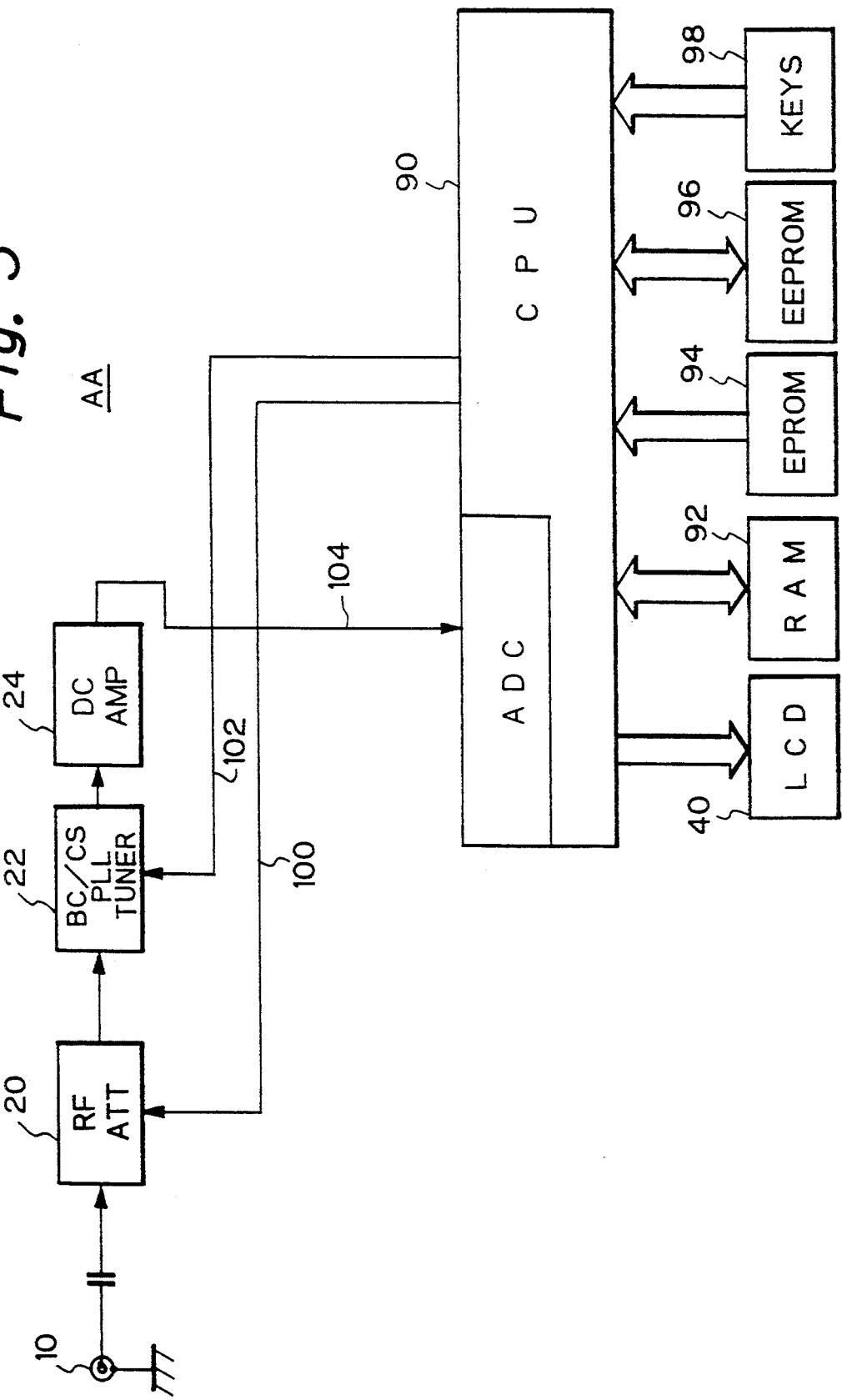
FIG. 3 is a block diagram illustrating a circuit of a TV/SAT signal level meter AA which embodies the basic configuration of FIG. 1.

As shown in FIG. 3, the meter AA comprises a radio frequency attenuator 20 coupled to an input terminal 10 (providing attenuation ranging 0–60 dB with steps of 10 dB); a BS/CS tuner 22 (for example, having a bandwidth of 24 MHz) coupled to the output of the attenuator 20; and a direct current amplifier 24 for amplifying a detection output of the tuner 22. The meter AA also comprises a CPU 90 and a variety of elements associated therewith, i.e., a liquid crystal display (LCD) unit 40 (having for example, 128×160 dots); a RAM 92 (for storing part of software); an EPROM 94 (for storing software); an EEPROM 96 (for storing data); and a group of keys 98. The CPU 90 outputs a signal for specifying an attenuation ratio to the attenuator 20 on a line 100, as well as frequencies to be tuned, i.e., the frequencies N1 and N2 and the carrier frequency ($f_c$), to the tuner 22 on a line 102. Further, the CPU 90 receives a detection output obtained with a specified attenuation ratio in a specified frequency band from the amplifier 24 through a line 104 at an ADC incorporated in the CPU.

Figure 4:
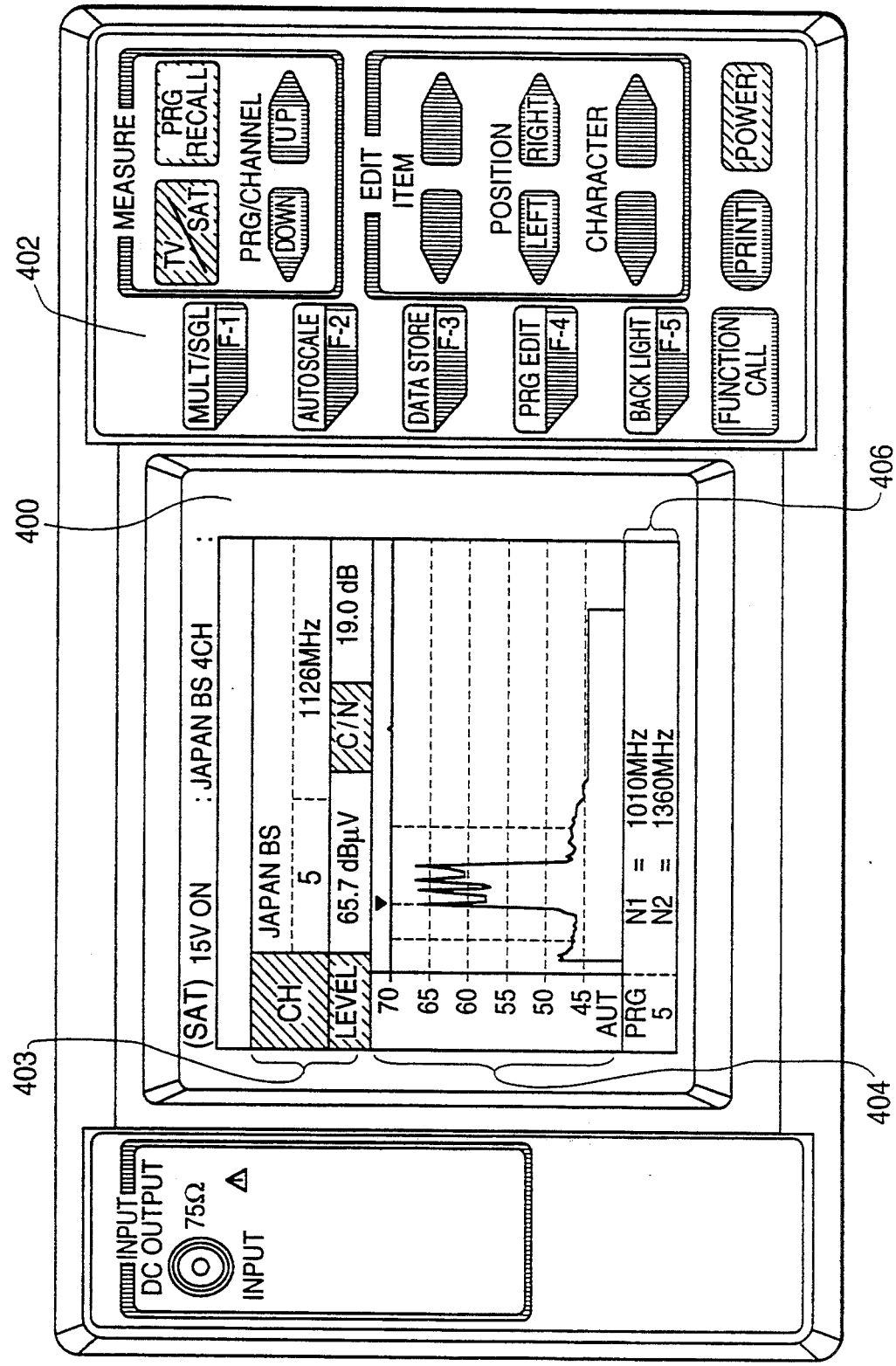
FIG. 4 is a view illustrating a front panel of the signal level meter shown in FIG. 3.

FIG. 4 illustrates a front panel of the meter AA. As can be seen from the drawing, the front panel has a display screen 400 and an operation panel 402. While the display screen 400 is capable of presenting displays in a variety of patterns, the illustrated screen presents a region 403 for displaying information on a channel (channel number, frequency, measured level, CN ratio and so on); a spectrum display region 404 for displaying the frequency spectrum of a band under measurement in a bar-graph form; and a region 406 for displaying noise measuring frequencies. The operation panel 402 includes a measuring key group, an editing (EDIT) key group, and another key group. The measuring key group includes a TV/SAT selection key, a program recall (PRG RECALL) key, and an up/down key for PRG/CHANNEL. The editing key group includes an item selection (ITEM) key, a position selection (POSITION) key, and a character selection (CHARACTER) key.

Figure 5:
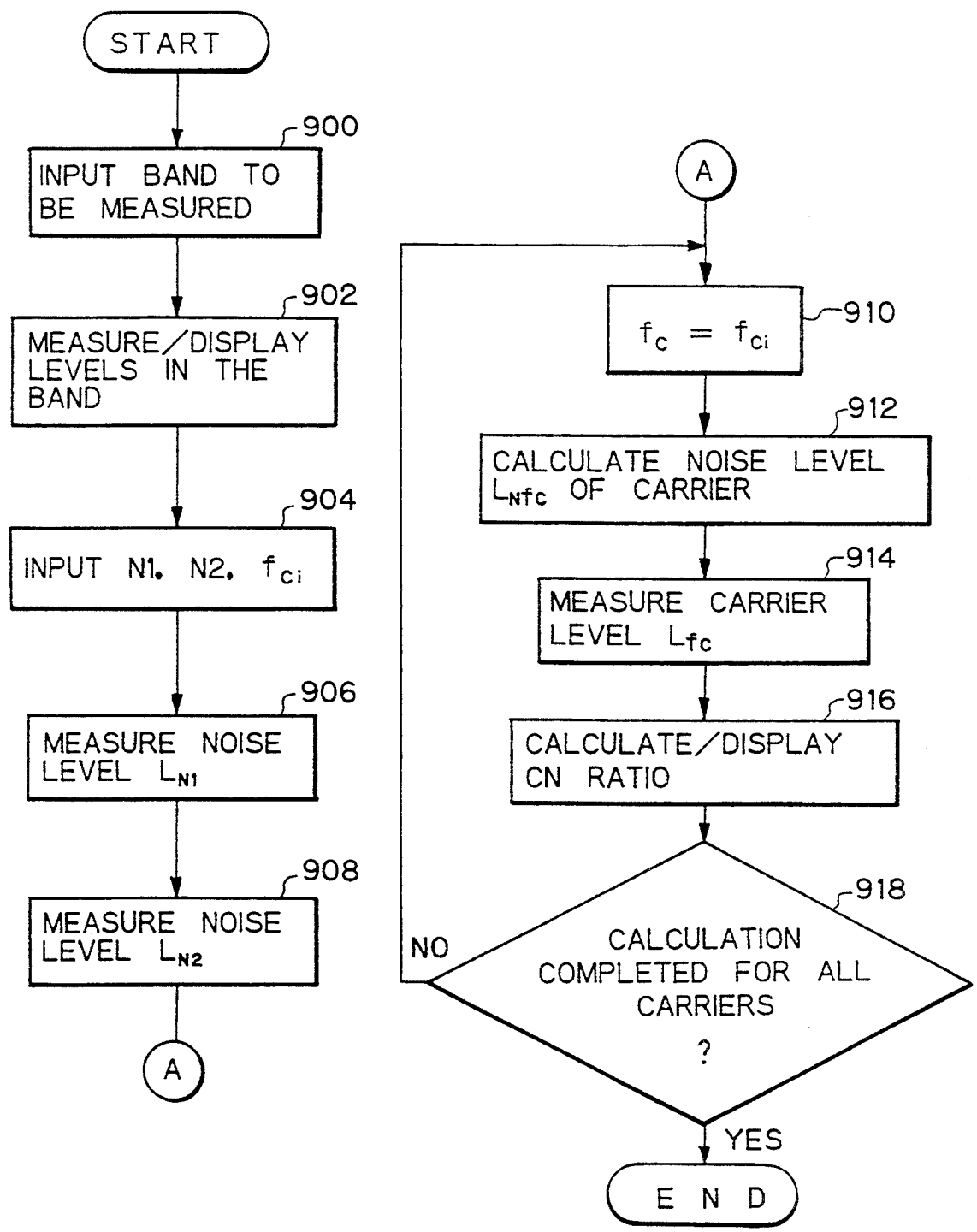
FIG. 5 is a flowchart illustrating a procedure of the CN ratio measurement executed by a CPU shown in FIG. 3.
Figures 6A, 6B, 6C:
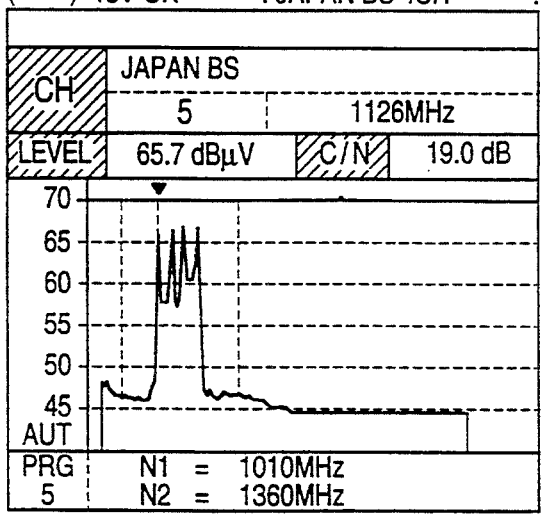
FIGS. 6(a)-6(c) are diagrams illustrating images displayed on the screen of FIG. 4 during executing the CN ratio measuring flow.

Next, the operation of the meter AA will be explained with reference to a flowchart of FIG. 5 showing a procedure of the CN ratio measurement and examples of displayed images on the screen shown in FIGS. 6-9. It should be noted that the operation of the meter AA is divided into a level measurement/display mode and a CN ratio measurement/display mode.

First, entering the level measurement/display mode, a band subjected to level measurement is first inputted at step 900. Next, at step 902, measured levels in the band under measurement are displayed in a spectrum form as shown in FIG. 4 (selected channel and N1 and N2 displayed in FIG. 4 are those which have previously been set).

Next, after entering the CN ratio measurement/display mode, a CN ratio measurement process is started at step 904, where the noise measuring frequencies N1 and N2 and one or more carrier frequencies $f_{ci}$ ($i=1,2,3,\ldots$) are inputted. More specifically, the PRG EDIT key is depressed to cause <SAT> PRG EDT screen to appear (FIG. 6(a)). Now, each channel at which the CN ratio is to be measured is set (in FIG. 6(a), four BS channels 5, 7, 9 and 11 have been set). Next, the ITEM key is depressed to invert in intensity the display region showing the C/N setting which is now indicating "OFF" (FIG. 6(b)). Next, the CHARACTER key is depressed to switch the C/N setting from "OFF" to "ON". Thus, a screen for setting noise measuring frequencies is displayed (FIG. 6(c)).

Figure 7A:
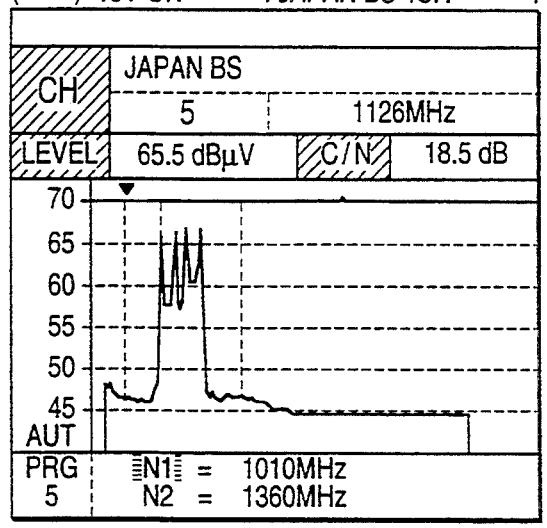
FIGS. 7(a)-7(c) are diagrams illustrating displays presented on the screen of FIG. 4 during executing the CN ratio measuring flow.
Figure 7B:
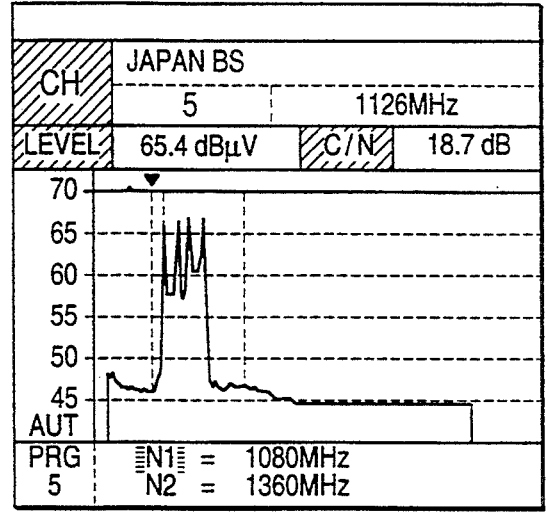
Figure 7C:
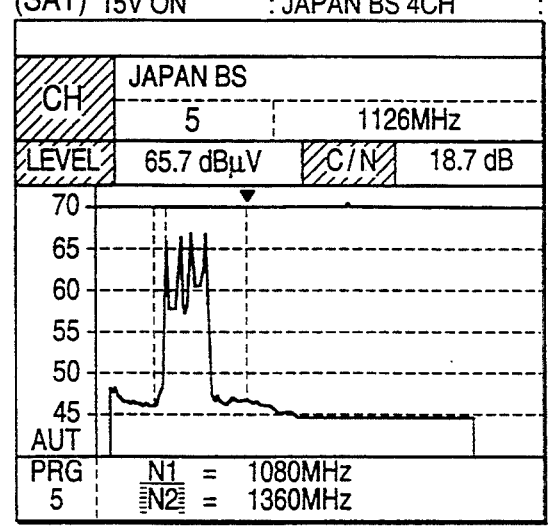

Next, the ITEM key is depressed to invert in intensity the display of the noise measuring frequency N1 in a lower portion of the screen (FIG. 7(a)). At this time, an inverted black triangle ( ) is moved to a cursor indicating N1 on a displayed bar graph, and an initially set value of the frequency N1 is displayed in a region under the bar graph (N1 = 1010 MHz). Next, the PRG/CHARACTER key is depressed to set the frequency N1 to a desired frequency which is lower than the lowest carrier frequency of all and close to the carrier frequency (preferably, separated by approximately 40 MHz), i.e., 1,080 MHz in this example (FIG. 7(b)). In this example, the noise measuring frequency can be set in a range from 950 to 1,600 MHz with steps of 10 MHz.

Next, the ITEM key is depressed to invert in intensity the display indicating the noise measuring frequency N2. At this time, the inverted black triangle ( ) is moved to a cursor indicating N2 on the displayed bar graph, and an initially set value of N2 is displayed as N2=1360 MHz (FIG. 7(c)). Subsequently, the PRG/CHARACTER key is used to set the frequency N2 to a desired frequency which is higher than the highest carrier frequency and close to the carrier frequency (preferably separated by approximately 40 MHz), i.e., 1,280 MHz in this example (FIG. 8(a)). Thereafter, the PRG EDIT key is depressed to return to the <SAT> PRG EDIT screen (FIG. 8(b)). Then, the C/N setting is displayed as being "ON" for the BS channels 5, 7, 9 and 11, and the frequencies N1 and N2 set at values by the foregoing procedure are displayed on the screen. When all the setting has been completed for the channels, the contents of the setting can be programmed as shown in FIG. 8(c).

Next, at step 906, a noise level $L_{N1}$ (in dBµV) is measured at the frequency N1. For this purpose, the CPU 90 supplies the tuner 22 with a signal for tuning the same at the frequency N1 and the attenuator 22 with a signal for specifying an appropriate attenuation ratio, and receives, as a result, a DC level value from the amplifier 24. The DC level value is used to calculate a received level together with the specified attenuation ratio. Further, the received level is subjected to a level compensation with respect to an average detection of noise of the tuner 22 (the compensation is performed because the relation between the input level and DC output level of the amplifier 24 is deviated between noise and carrier), and a band conversion (from 24 MHz to 27 MHz) is performed to derive a measured noise level $L_{N1}$. Likewise, at step 908, a measured noise level $L_{N2}$ (in dBµV) is derived for the frequency N2.

Next, at step 910, the carrier frequency $f_c$ is set to $f_{c1}$ (the frequency of the BS channel 5, in this example), and a noise level $L_{Nfc}$ (in dBµV) of the carrier frequency is calculated according to the following equation:

$$L_{Nfc}=[\{(f_c-N1)/(N2-N1)\}(L_{N1}-L_{N2})]+L_{N1}$$

This is the method explained in connection with FIG. 2 which calculates the noise level by linear approximation. Next, at step 914, a level $L_{fc}$ of the carrier is measured. This is performed also in a method similar to that explained at step 906. However, performed this time is a compensation with respect to the average detection of a carrier. Subsequently, at step 916, the CN ratio for the channel is calculated by the following equation, and the calculation result is displayed.

$$CN\ ratio = L_{fc}-L_{Nfc}$$

Next, at step 918, it is determined whether the CN ratios have been measured for all the channels. If NO, the steps 910-916 are repeated for a next channel (the BS channel 7 in this example), and this flow is terminated when the answer to the determination at step 918 is YES.

FIGS. 9(a) and 9(b) illustrate examples of available screens after the CN ratios have been measured for all the specified BS channels 5, 7, 9 and 11. More specifically, FIG. 9(a) illustrates a screen which displays a bar graph representation of the respective levels of all the channels and information on a channel indicated by a cursor (i.e., channel 5), and FIG. 9(b) illustrates a screen which displays only one of all the channels (channel 5 in this example) in greater detail. FIG. 9(c) in turn shows a printed list of data on all the specified channels.

One embodiment of the present invention has been explained in connection with BS channels. As will be understood, the present invention can also be applied to other transmission channels such as communication satellite (CS) channels, wired and wireless TV transmission channels, micro-wave cables, and so on. Also, the frequencies N1 and N2 may be set by inputting numerical values instead of manipulating the PRG/CHARACTER key.

According to the present invention as described above, since a common level measuring circuit can be used for measuring noise levels and carrier levels, the measuring apparatus can be manufactured at a lower cost. Also, since the user is freed from the necessity of making complicated calculations, the measurement can be easily made. Further, the present invention is advantageous in that the CN ratio measurement can be achieved even if modulating waves such as video signals are different.

What is claimed is:

1. A carrier-to-noise (CN) ratio measuring apparatus for measuring a CN ratio of a signal transmitted through at least one transmission channel included in a transmission path, comprising:

level measuring means having an input for receiving an output of said transmission path, a frequency specifying input for receiving signals which specify frequencies, an output for generating levels measured at frequencies specified by the signals received by said frequency specifying input;

means for generating to said frequency specifying input a signal which specifies a frequency band in which the output of said transmission path is to be measured;

display means coupled to the output of said level measuring means for displaying a spectrum of said measured levels in said frequency band under measurement;

transmission channel selecting means coupled to said frequency specifying input for specifying a first frequency which is a carrier frequency of a selected one in said at least one transmission channel, said carrier frequency of said selected transmission channel being within said frequency band under measurement;

noise measuring frequency specifying means coupled to said frequency specifying input for specifying a second frequency which is lower than the carrier frequency of said selected transmission channel and at which no signal components are present, and a third frequency which is higher than the carrier frequency of said selected transmission channel and at which no signal components are present, said second and third frequencies being also within said frequency band under measurement, said second and third frequencies being capable of being varied by an operator; and CN ratio calculating means coupled to an output of said transmission channel selecting means, an output of said noise measuring frequency specifying-means and the output of said level measuring means for deriving said CN ratio of said selected transmission channel from said first, second and third frequencies and first, second and third measured levels, said first, second and third measured levels being derived from the output of said level measuring means when respective signals specifying said respective first, second and third frequencies are applied to the frequency specifying input of said level measuring means, said CN ratio calculating means including:

1. means for deriving a fourth level, which is a noise level at said first frequency, from said second and third measured levels and said first, second and third frequencies by determining the fourth level at said first frequency from the second measured level at said second frequency and the third measured level at said third frequency by linear approximation; and 2. means for deriving said CN ratio from said first measured level and said fourth level.

2. A carrier-to-noise ratio measuring apparatus according to claim 1, wherein said second and third frequencies are specified to values which are regarded to exhibit a noise level linearity between the second and third frequencies with respect to frequency, in accordance with the spectrum of measured levels displayed on said display means.

3. A carrier-to-noise ration measuring apparatus according to claim 1, wherein said at least one transmission channel includes a plurality of channels, said second frequency is specified to be a value lower than the lowest frequency channel of said plurality of channels, and said third frequency is specified to be a value higher than the highest frequency channel of said plurality of channels.

4. A carrier-to-noise ratio measuring apparatus according to any one of claims 1, 2 and 3, wherein an output of said CN ratio calculating means is coupled to said display means for displaying said CN ratio on said display means.

5. A carrier-to-noise ratio measuring apparatus according to any one of claims 1, 2 and 3, wherein said level measuring means includes a radio frequency attenuator having an input and an output, a tuner having an input connected to the output of the attenuator and an output, and a direct current amplifier having an input connected to the output of the tuner and an output.

6. A carrier-to-noise (CN) ratio measuring apparatus for measuring a CN ratio of a signal transmitted through at least one transmission channel included in a transmission path and for deriving a noise power on a selected transmission channel comprising:

level measuring means having an input for receiving an output from said transmission path, a frequency specifying input for receiving signals for specifying frequencies, an output for generating levels measured in every predetermined frequency band at frequencies specified by the signals received by said frequency specifying input:

means for generating to said frequency specifying input, a signal which specifies a frequency band in which the output of said transmission path is to be measured:

display means coupled to the output of said level measuring means for displaying the spectrum of said measured levels in said frequency band under measurement;

transmission channel selecting means coupled to said frequency specifying input for specifying a first frequency which is a carrier frequency of said selected transmission channel, paid carrier frequency of said selected transmission channel being within said frequency band under measurement;

noise measuring frequency specifying means coupled to said frequency specifying input for specifying in accordance with the spectrum of said measured levels displayed a second frequency which is lower than the carrier frequency of said selected transmission channel and at which no signal components are present, and a third frequency which is higher than the carrier frequency of said selected transmission channel and at which no signal components are present, said second and third frequencies being also within said frequency band under measurement, said second and third frequencies being capable of being varied by an operator; and means coupled to an output of said transmission channel selecting means, an output of said noise measuring frequency specifying means and the output of said level measuring means for deriving said noise power of said selected transmission channel from said first, second and third frequencies and first and second measured levels, said first and second measured levels being derived from the output of said level measuring, means when respective signals specifying said respective second and third frequencies are applied to the frequency specifying input of said level measuring means, said means for deriving said noise power including:

means for deriving a third level, which is a noise level at said first frequency, from said first and second measured levels and said first, second and third frequencies by determining the third level at said first frequency from the first measured level at said second frequency and the second measured level at said third frequency by linear approximation.

7. A carrier-to-noise ratio measuring apparatus according to claim 6, wherein said second and third frequencies are specified to values which are regarded to exhibit a noise level linearity between the second and third frequencies with respect to frequency, in accordance with the spectrum of measured levels displayed on said display means.

8. A carrier-to-noise ratio measuring apparatus according to claim 6, wherein said at least one transmission channel includes a plurality of channels, said second frequency is specified to be a value lower than the lowest frequency channel of said plurality of channels, and said third frequency is specified to be a value higher than the highest frequency channel of said plurality of channels.

* * * * *